US007457112B2

(12) United States Patent
Fukuda et al.

(10) Patent No.: US 7,457,112 B2
(45) Date of Patent: Nov. 25, 2008

(54) DISK ARRAY APPARATUS

(75) Inventors: Hiroshi Fukuda, Odawara (JP); Hitoshi Matsushima, Ryugasaki (JP)

(73) Assignee: Hitachi, Ltd., Tokyo (JP)

( * ) Notice: Subject to any disclaimer, the term of this patent is extended or adjusted under 35 U.S.C. 154(b) by 457 days.

(21) Appl. No.: 11/261,620

(22) Filed: Oct. 31, 2005

(65) Prior Publication Data

US 2007/0053154 A1    Mar. 8, 2007

(30) Foreign Application Priority Data

Sep. 2, 2005    (JP)    ............... 2005-254644

(51) Int. Cl.
*H05K 5/00*    (2006.01)
*H05K 7/20*    (2006.01)
*H05K 7/16*    (2006.01)
*G06F 1/20*    (2006.01)

(52) U.S. Cl. .................. 361/687; 361/696; 361/698; 361/724; 361/725

(58) Field of Classification Search ................ 361/687, 361/724, 725, 727, 730, 731, 735, 696, 698
See application file for complete search history.

(56) References Cited

U.S. PATENT DOCUMENTS 5,414,591 A *   5/1995  Kimura et al. ............. 361/695
6,144,553 A *  11/2000  Hileman et al. ............ 361/687
6,643,132 B2 * 11/2003  Faneuf et al. .............. 361/700
6,690,575 B1 *  2/2004  Banton et al. .............. 361/690
6,778,387 B2 *  8/2004  Fairchild ................... 361/687
6,927,980 B2 *  8/2005  Fukuda et al. ............. 361/700
7,167,359 B2 *  1/2007  Wendel et al. ............. 361/685
7,242,580 B1 *  7/2007  Tanaka ....................... 361/696
2004/0236985 A1* 11/2004  Durica et al. .................. 714/7
2004/0264133 A1* 12/2004  Fukuda et al. ............. 361/695
2005/0057898 A1   3/2005  El-Batal et al.
2005/0114876 A1*  5/2005  Atarashi et al. ............ 720/649

FOREIGN PATENT DOCUMENTS

JP    2005-18926    6/2003
WO   WO 00-49487   2/2000

OTHER PUBLICATIONS

European Search Report dated May 29, 2006.

* cited by examiner

*Primary Examiner*—Jayprakash N Gandhi
*Assistant Examiner*—Anthony M Haughton
(74) *Attorney, Agent, or Firm*—Reed Smith LLP; Stanley P. Fisher, Esq.; Juan Carlos A. Marquez, Esq.

(57) ABSTRACT

A disk array apparatus including a rack-shaped basic frame, and a plurality of disk boxes that can be inserted into and pulled out of the basic frame depth-wise. Each disk box has: disk drive connectors for connecting a plurality of disk drives arranged in a matrix on a platter substrate, which is the bottom face of the disk box, roughly parallel to the depth direction of the basic frame; and a cooling module for cooling the disk drives. The disk box is a hermetically sealed structure.

13 Claims, 15 Drawing Sheets

DISK ARRAY APPARATUS

CROSS-REFERENCES TO RELATED APPLICATIONS

This application relates to and claims priority from Japanese Patent Application No. 2005-254644, filed on Sep. 2, 2005, the entire disclosure of which is incorporated herein by reference.

BACKGROUND OF THE INVENTION

The present invention relates to a disk array apparatus for mounting a plurality of disk drives.

A disk array apparatus that stores large-volume data carries a multiplicity of disk drives and provides storage areas configured, for example, in a RAID (Redundant Arrays of Independent/Inexpensive Disks) system, to a host system. A conventional disk array apparatus is configured in such a way that a plurality of disk boxes is mounted in a rack-shaped basic frame. Each disk box contains a plurality of disk drives. The disk drives are placed on a back board formed on the back face of the disk box and thereby electrically connected to a disk controller and a power supply unit.

As the high-density mounting of disk array apparatuses continues, electric power consumption and heat production are increasing steadily. Fan capacity is being increased more and more as a measure against the increasing heat generation. However, due to high-density mounting, air resistance within a disk array apparatus has increased, and a sufficient cooling effect cannot be obtained. The fan capacity has to be increased in order to counter the attenuation of cooling air due to the increase in air resistance. Under these circumstances, production of noisy disk array apparatuses with high electric power consumption is being accelerated. Various kinds of configurations have been examined as cooling configurations for a disk array apparatus. For example, JP-A-2005-18926 suggests the technology of transporting the heat generated from disk drives to the outside of the disk drives and discharging the heat from a heat sink formed on the back face of a back board.

SUMMARY OF THE INVENTION

However, a conventional disk array apparatus is configured in such a way that disk drives are installed only two-dimensionally. Accordingly, the number of disk drives that can be mounted is limited and, therefore, this is not sufficient for installing a multiplicity of small-sized disk drives. In a current trend in the development of hard disks, the downsizing of disk drives is proceeding from 3.5 inches to 2.5 inches. Therefore, it can be expected that the quantity of mounted disk drives per disk array apparatus and the heating value per unit volume will increase. Consequently, there is a demand for a disk array apparatus that can sufficiently carry a multiplicity of small-sized disk drives as well as achieve sufficient cooling and low-noise.

Therefore, it is an object of this invention to provide a disk array apparatus that can carry a multiplicity of small-sized disk drives, as well as achieve sufficient cooling and low-noise.

In order to achieve the above-described object, a disk array apparatus according to this invention includes: a rack-shaped basic frame; and a plurality of disk boxes that can be inserted into and pulled out of the basic frame depth-wise. Each disk box has a coupling structure for connecting a plurality of disk drives arranged in a matrix on the bottom face of the disk box roughly parallel to the depth direction of the basic frame. A multiplicity of small-sized disk drives can be installed by arranging the disk drives depth-wise in the basic frame and on the bottom face of the disk box.

The disk box is preferably composed of a hermetically sealed structure. Because of the hermetically sealed configuration of the disk box, low-noise can be expected even if a cooling fan is installed in the disk box. Moreover, as the hermetically sealed configuration is employed for the disk box, an air-cooling system is applied to cool the disk drives, and a refrigeration cycle system or a liquid-cooling system can be applied as a cooling system for exchanging heat between the disk drives. It is possible to construct an independent cooling mechanism for each disk box and provide optimum cooling control for each disk box by installing a cooling module in each disk box.

It is desirable that the cooling module installed in each disk box include: a heat transport medium for transporting the heat generated from the disk drives to the outside of the disk box; a blower mechanism for forcedly circulating gas within a hermetically sealed space of the disk box; and a heat exchanger for exchanging heat between the gas in the hermetically sealed space and the heat transport medium. This cooling configuration enables heat exchange with outside air even if the disk box is sealed from the outside air. Accordingly, the heat from the disk drives can be discharged to the outside of the disk box.

Ideally the cooling module should include: a temperature sensor for detecting the internal temperature of the disk box; and a control board for adjusting the air distribution amount of the blower mechanism based on the temperature detected by the temperature sensor. This configuration enables optimum cooling control of each disk box. A redundant configuration including at least two blower mechanisms may also be applied in order to enhance reliability.

As for the materials for the disk box, either a heat insulator or a sound insulator, or a combination of both may be used. Using the heat insulator for the disk box can inhibit the formation of dew condensation inside the disk box due to a decrease in the outside air temperature. Using the sound insulator for the disk box can further enhance noise insulation.

It is desirable that the disk array apparatus further include a cooling system for exchanging heat between the disk boxes. This configuration can discharge the heat collected from each disk box to the outside air. Since no refrigerant outflow or inflow takes place between the cooling module of the disk box (primary cooling system) and the cooling system of the disk array apparatus (secondary cooling system), it is desirable that these cooling systems be designed to enable smooth heat exchange.

The disk array apparatus may further include a disk controller. The disk controller enables removal of a disk box in which an error has occurred after backing up the data on the disk drives mounted in that disk box to another disk box.

According to this invention, it is possible to provide a disk array apparatus that can carry a multiplicity of small-sized disk drives as well as achieve sufficient cooling and low-noise.

DETAILED DESCRIPTION OF THE INVENTION

Preferred embodiments of this invention will be described below in detail with reference to the attached drawings.

Figure 1:
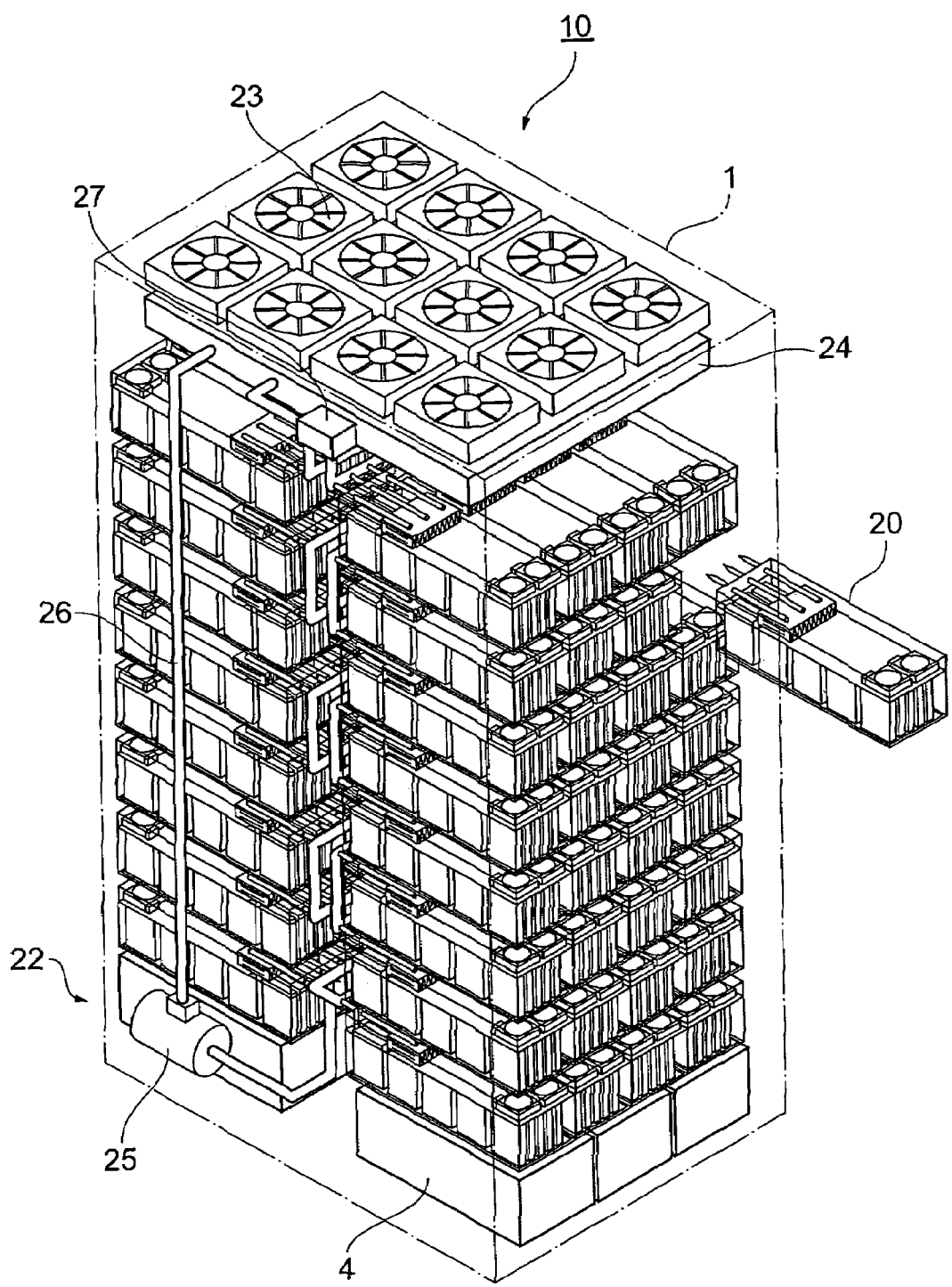
FIG. 1 is an external view of a disk array apparatus according to an embodiment of this invention.

FIG. 1 shows the external view of a disk array apparatus 10 according to an embodiment of this invention. The main components of the disk array apparatus 10 are a rack-shaped basic frame 1 and a plurality of disk boxes 20.

The basic frame 1 forms the basic skeleton of the disk array apparatus 10 and has a frame structure that can mount a plurality of disk boxes 20 on both its front and back sides. The disk box 20 is a box used to accommodate a plurality of disk drives and has a box structure that allows the disk box 20 to be freely inserted into or pulled out of the basic frame 1 depth-wise.

A power supply unit 4 for supplying electric power to the disk boxes 20 is placed at the bottom of the basic frame 1. The power supply unit 4 contains an AC power supply and an AC/DC converter. By locating the heavy-weight power supply unit 4 at the bottom of the disk array apparatus 10, the center of gravity can be lowered, thereby enhancing stability in an earthquake. The basic frame 1 is also equipped with a cooling system 22 for cooling each disk box with refrigeration cycles. This cooling system 22 includes cooling fans (or blower mechanism) 23, a secondary radiator 24, a compressor 25, a refrigerant flow path 26, and an expansion valve 27.

Incidentally, the disk array apparatus 10 shown in FIG. 1 is a so-called "expanded chassis" and has no disk controller. However, this invention can be also applied to a basic chassis including a disk controller.

Figure 2:
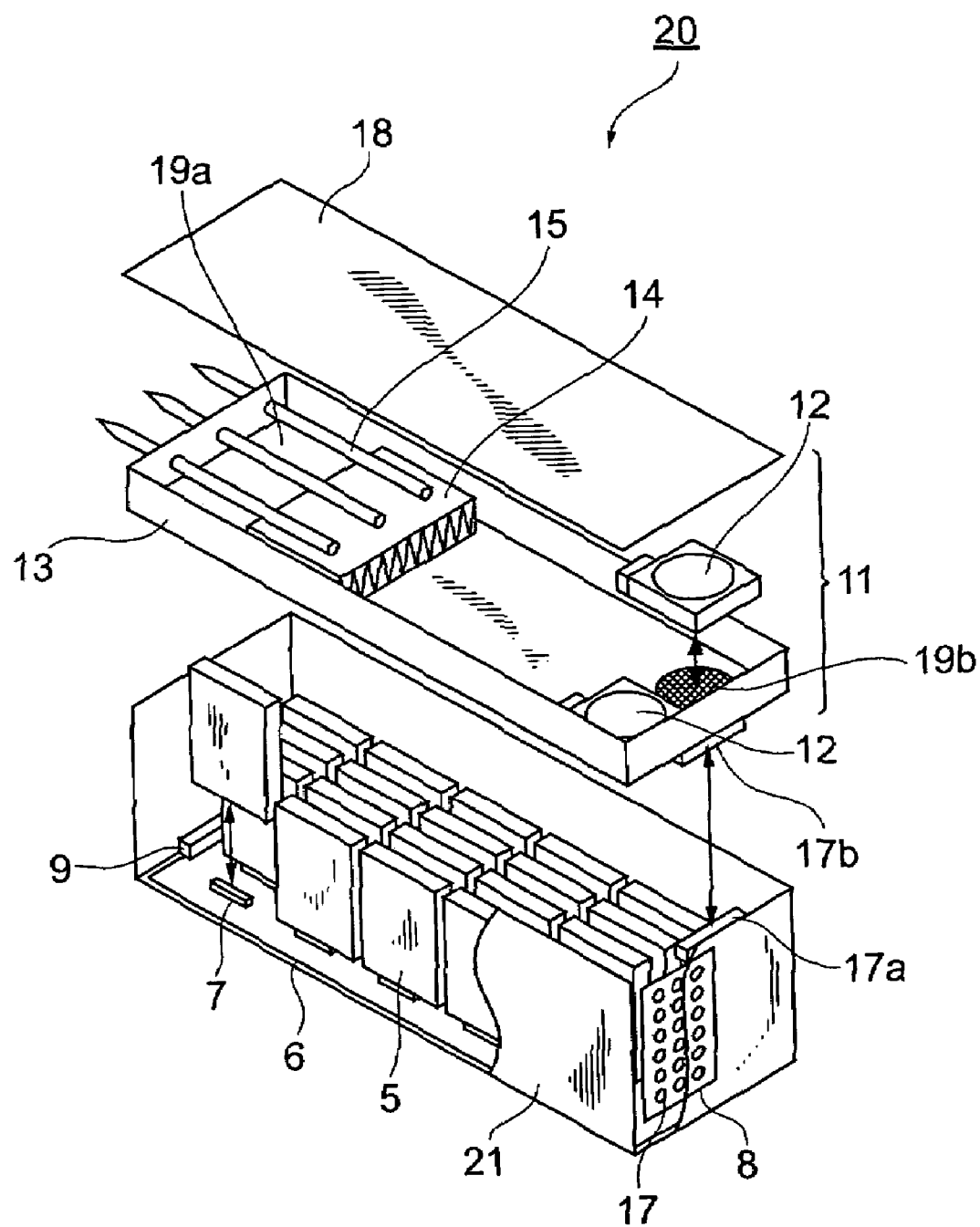
FIG. 2 is an exploded perspective view of a disk box according to an embodiment of this invention.

FIG. 2 is an exploded perspective view of the disk box 20 according to the embodiment. The main components of the disk box 20 are a box body 21 and a cooling module 11.

A platter substrate 6 is placed at the bottom of the box body 21. When inserting the disk box 20 into the basic frame 1, the platter substrate 6 is positioned in such a way that the disk box 20 will be inserted in a direction roughly parallel to the depth direction of the basic frame 1. The platter substrate 6 provides a connection interface for data and control signals sent and received between a disk controller 70 (see FIG. 16) and the disk box 20, and also provides an interface to supply electric power from the power supply unit 4 to the disk box 20.

The platter substrate 6 is equipped with a main connector 9 for connecting the disk controller 70 and the power supply unit 4 to the platter substrate 6; and disk drive connectors 7 for connecting the respective disk drives 5 to the platter substrate 6. The disk drive connector 7 has a coupling structure for connecting the disk drives 5 to the platter substrate 6. The disk drives 5 are arranged in a matrix, that is, in rows and columns on the patter substrate 6. By mounting the disk drives 5 on the disk drive connectors 7, the disk drives 5 can be arranged in a matrix on the platter substrate 6. By arranging the disk drives 5 in a matrix on the platter substrate 6, the disk drives 5 can be mounted not only in the width direction, but also the depth direction of the basic frame 1 when the disk box 20 is inserted into the basic frame 1. As a result, mounting density can be enhanced.

The disk drive 5 is a module made by assembling a disk body (including a magnetic disk, a drive motor, a magnetic head, and an actuator) and a package board. A preferred example of the disk drive 5 is a small-sized disk drive such as a 2.5-inch disk drive.

The box body 21 has a display board 8 equipped with LEDs (light emitting diodes) 17 for displaying the operation state/failure status for each disk drive 5, and also indicating any failure of the cooling fans (or blower mechanism) 12. A connector 17a is attached to the display board 8. By connecting a connector 17b on the cooling module 11 to the connector 17a of the display board 8, electric power and a drive control signal to drive the cooling fans 12 can be supplied to the cooling fans 12.

The electric power and the drive control signal to drive the cooling fans 12 may be supplied not only via the connectors 17a and 17b as described above, but also by connecting the platter substrate 6 and the cooling module 11 with cables or similar.

The cooling module 11 is the module to cool the disk box 20 in each disk box. The main components of the cooling module 11 are a module body 13 and a module cover 18.

The module body 13 is equipped with the cooling fans 12, a heat exchanger 14, and heat transport media 15. Ventilation holes 19a and 19b for circulating gas within the disk box 20 are formed at both ends of the module body 13. The cooling fans 12 are mounted above the ventilation holes 19b and can rotate at a certain rotation speed to produce an air current within the internal space of the disk box 20. Ideally, a plurality of cooling fans 12 is mounted in the disk box 20. If this redundancy configuration is adopted, even if a failure occurs in one of the cooling fans 12, the air current can be produced within the disk box 20 by driving another cooling fan 12.

The heat exchanger 14 is located in the flow path of the air current produced within the cooling module 11. The heat exchanger 14 is, for example, a heat sink or a radiator. The heat exchanger 14 exchanges heat with circulated gas, whose temperature has risen due to the heat generated by the disk drives 5, and transfers the heat to the heat transport media 15.

The heat transport media 15 are heat conduction media, such as heat pipes, having excellent heat conductivity, that transport the heat collected from the disk drives 5 to the outside of the disk box 20.

The cooling module 11 forms a hermetically sealed structure with excellent airtightness by attaching a module cover 18 to the top of the module body 13. Moreover, the disk box 20 forms a hermetically sealed structure with excellent airtightness by attaching the cooling module 11 to the top of the box body 21. The air current forcedly circulated by the cooling fans 12 enters and exits only through the ventilating holes 19a and 19b. The air current does not flow out of the disk box 20, nor does the outside air enter the disk box 20. By hermetically sealing the disk box 20 as described above, it is possible to inhibit the leakage of noise from the cooling fans 12 to the outside of the disk box 20. Noise insulation can be further enhanced by either attaching a sound insulator to the inside wall of the disk box 20 or using a sound insulator to make the disk box 20. Moreover, no dust-proof filter is required because the outside air does not enter the disk box 20.

The hermetically sealed configuration of the disk box 20 blocks air permeability between the inside of the disk box 20 and the outside air. Therefore, there is the possibility that condensation may occur, depending on conditions such as humidity, temperature, and the condensation point of the inside of the disk box 20. Since dew condensation in the disk box 20 is unwanted, ideally a moisture-absorbing material is used in the disk box 21.

Figure 3:
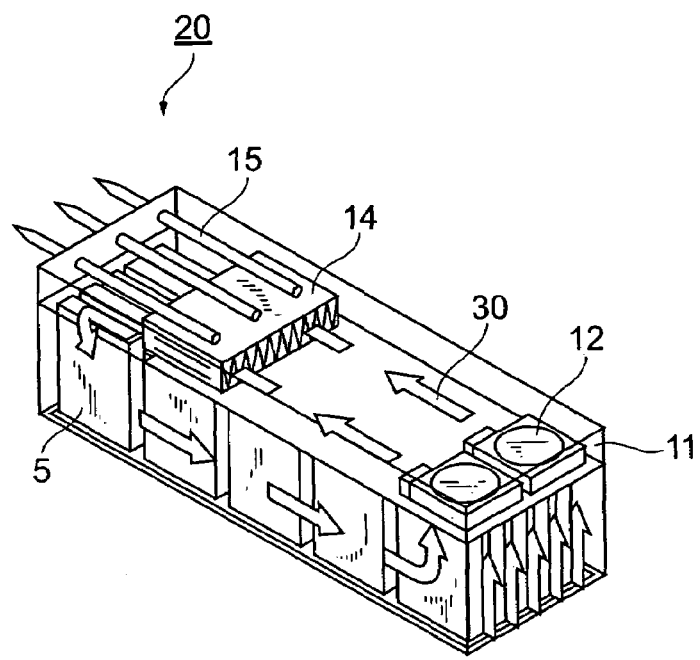
FIG. 3 is an oblique perspective view of the disk box.
Figure 4:
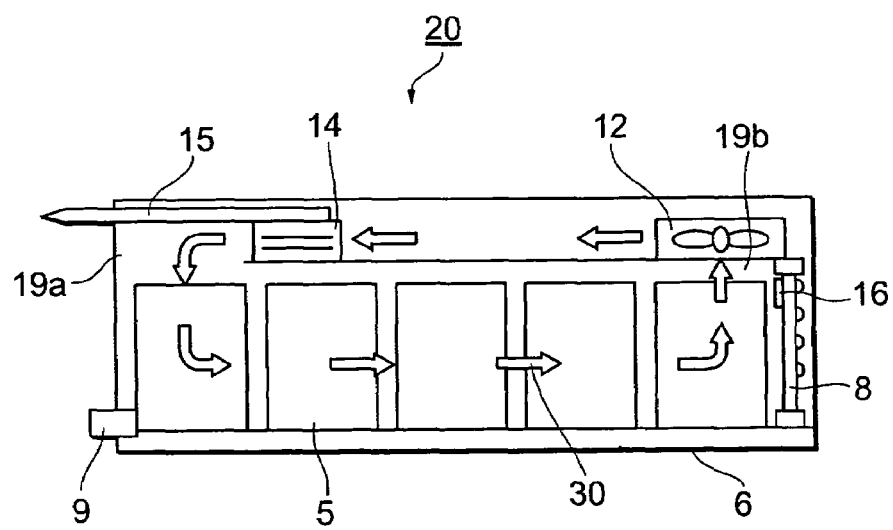
FIG. 4 is a side perspective view of the disk box.

The cooling effect of the disk box 20 will be described below with reference to FIGS. 3 and 4. FIG. 3 is an oblique perspective view of the disk box 20. FIG. 4 is a side perspective view of the disk box 20. Since the disk box 20 has a hermetically sealed configuration blocked from the outside air, an air current 30 is produced within the disk box 20 by driving the built-in cooling fans 12. The gas absorbed through the ventilation holes 19b to the cooling module 11 by the intake action of the cooling fans 12 passes through the heat exchanger 14 and then returns through the ventilation hole 19a to the box body 21. The heat transport media 15 are configured so as to enable heat connection with a refrigerant flow path as described later (see FIGS. 5, 7, and 8). If a temperature gradient exists between the refrigerant flow path 26 and the heat exchanger 14, heat exchange can be conducted via the heat transport media 15 between the outside and inside of the disk box 20 even if the disk box 20 is blocked from the outside air.

In other words, if a temperature gradient resulting from the heat quantity absorbed by the heat exchanger 14 being larger than the heat quantity radiated from the refrigerant flow path 26 exists, when the air current 30 passes through the heat exchanger 14, the heat of the air current 30 is drawn off and the air current 30 thereby becomes a low-temperature gas; and the low-temperature air current 30 passes through the disk drives 5 and absorbs heat generated from them. The air current 30, which has absorbed the heat from the disk drives 5 when passing through them, gives that heat to the heat exchanger 14 again. Repetition of this heat radiation cycle causes the heat from the disk drives 5 to be radiated to the outside of the disk box 20. If the temperature gradient, which causes the heat radiation cycle, is created purposely by relatively adjusting the air current 30 flow speed, the heat exchange ability of the heat exchanger 14, and the temperature and flow speed of the refrigerant flowing through for the refrigerant flow path 26, the heat from the disk drives 5 can be promptly discharged to the outside of the disk box 20. As the gas to fill the disk box 20 with, a gas with good heat exchange properties is preferred, and an ideal example of the gas is low-molecular helium gas.

Since the disk box 20 has a hermetically sealed configuration with excellent noise insulation, it is possible to mount a plurality of high-rotation cooling fans 12 with excellent air throughput. Specifically speaking, cooling fans 12 with the optimum air throughput to cool the disk drives 5 can be mounted without worrying about a noise problem arising from the operation of the cooling fans 12, and also in consideration of, the heat exchange ability of the heat exchanger 14 and the heat conductiveness of the heat transport media 15 as appropriate.

As a RAID group in the disk array apparatus 10, four disk drives 5 (3D+1P) or eight disk drives 5 (7D+1P) constitute one group. In other words, respective storage areas provided by a plurality of disk drives 5 are gathered together to form one RAID group. The RAID group is sometimes called a "parity group" or an "ECC group." One RAID group is mapped to a plurality of logical devices (LDEV), or a plurality of RAID groups is mapped to one logical device.

One or more logical devices are mapped to one logical unit (LU). A logical unit is a logical storage unit recognized by the host system. If the host system is a UNIX® system, logical units are associated with device files. If the host system is a Windows® system, logical units are associated with drive letters (or drive names). A unique LUN (Logical Unit Number) is assigned to each logical unit.

In order to arrange the disk drives 5 in a matrix on the platter substrate 6, ideally the plural disk drives 5 constituting the same RAID group are aligned in a direction perpendicular to the air current 30. By arranging the disk drives 5 in this manner, the cooling effect on the respective disk drives 5 constituting the same RAID group can be generally equalized. If the respective disk drives 5 constituting the same RAID group have different temperatures, there is a possibility that the reliability of the entire RAID group may decrease, which is undesirable. The number of the disk drives 5 to be mounted in each disk box 20 is preferably an integral multiple of the number of the disk drives 5 constituting the same RAID group.

The number of drive disks 5 mounted in the disk box 20 can be set arbitrarily, depending on the storage capacity desired by the user. The maximum number of disk drives 5 that can be mounted are not necessarily mounted in the disk box 20. Accordingly, dummy drives generally the same shape as the disk drives 5 may be mounted in the disk box 20. Dummy drives are mounted in the disk box 20 in order to adjust the air current 30 flowing in the disk box 20. If a number of disk drives 5 less than the maximum number are mounted in the disk box 20, areas with no disk drive 5 have a low resistance and a larger amount of the air current 30 will flow into those areas, causing bias in the flow rate distribution. In order to mount dummy drives in the disk box 20, the other disk drives 5 belonging to the same RAID group as the dummy drives need to be replaced with dummy drives. It is desirable that the plural dummy drives constituting the same RAID group be aligned in the direction perpendicular to the air current 30.

There is no special limitation to a reciprocal position relationship between a disk drive group constituting the same RAID group and a dummy disk drive group constituting the same RAID group. For example, an area where the disk drive group is mounted may be separated from an area where the dummy disk drive group is mounted; or the disk drive group and the dummy disk drive group may be placed alternately.

As shown in FIG. 4, it is desirable that a temperature sensor 16 for detecting the temperature of the hermetically sealed space in the box body 21 be placed in the box body 21. Since the respective disk boxes 20 have different internal temperatures depending on conditions such as the difference in frequency of access to the disk drives 5, optimum temperature adjustment can be realized by adjusting the rotation speed of the cooling fans 12 based on the temperature detected by the temperature sensor 16. In order to precisely detect the temperatures of the disk drives, each disk drive 5 is ideally equipped with a temperature sensor 16. However, as the number of mounted disk drives 5 increases, the number of components increases greatly. Also, because of the high-density mounting, space for installing a temperature sensor 16 is limited. Therefore, it is not realistic to provide each disk drive 5 with a temperature sensor 16. If a relationship between the temperature of the hermetically sealed space in the box body 21 and the temperatures of the disk drives 5 can be found in advance by, for example, conducting experiments, the temperatures of the disk drives 5 will be able to be detected with a certain degree of precision based on the temperature of the hermetically sealed space in the box body 21.

A preferred position for a temperature sensor 16 is the position where the temperature of the hermetically sealed space in the box body 21 will be able to be detected if all the cooling fans 12 become no longer operable due to a failure or similar (fail safe). If all the cooling fans 12 stop, heat generated by the disk, drives 5 will increase the temperature of the hermetically sealed space in the box body 21. Therefore, by installing the temperature sensor 16 at a position where it can detect the temperature of the hermetically sealed space, it is possible to detect any error before any disk drive 5 fails. A preferred position for the temperature sensor 16 is a position inside the box body 21 and near the intake side of the cooling fans 12. It is also possible to adopt a redundancy configuration by installing a plurality of temperature sensors 16 associated with the respective cooling fans 12.

Where both the disk drives 5 and dummy disk drives are mounted in the disk box 20, a position closer to the disk drives 5 than to the dummy disk drives is ideally selected as the position for the temperature sensor 16. Since the dummy disk drives carry no real magnetic disks and generate no heat, the temperature sensor 16 would not be able to detect the temperature of the disk drives accurately if it were located closer to the dummy disk drives.

Figure 5:
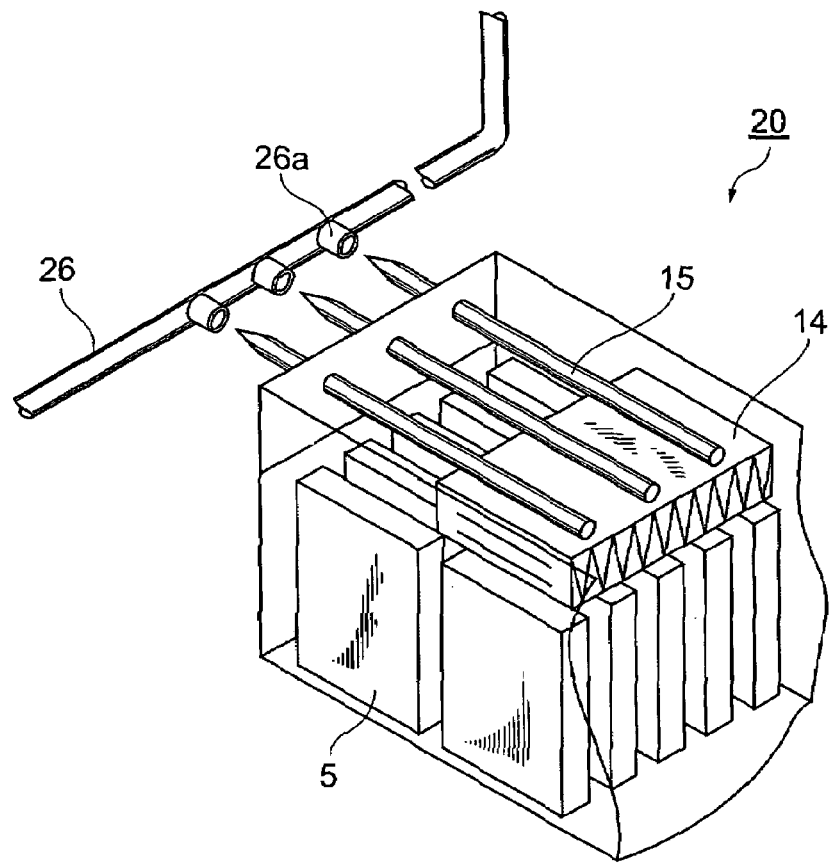
FIG. 5 is a perspective view of a coupling structure between a refrigerant flow path and heat transport media.
Figure 6:
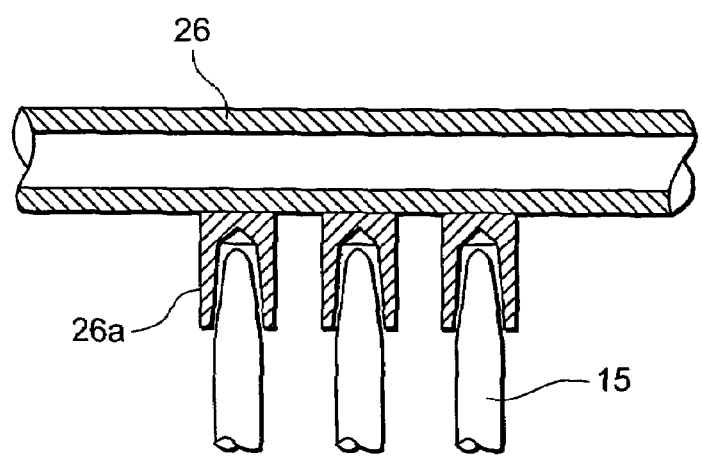
FIG. 6 is a sectional view of the coupling section between the refrigerant flow path and the heat transport media.
Figure 7:
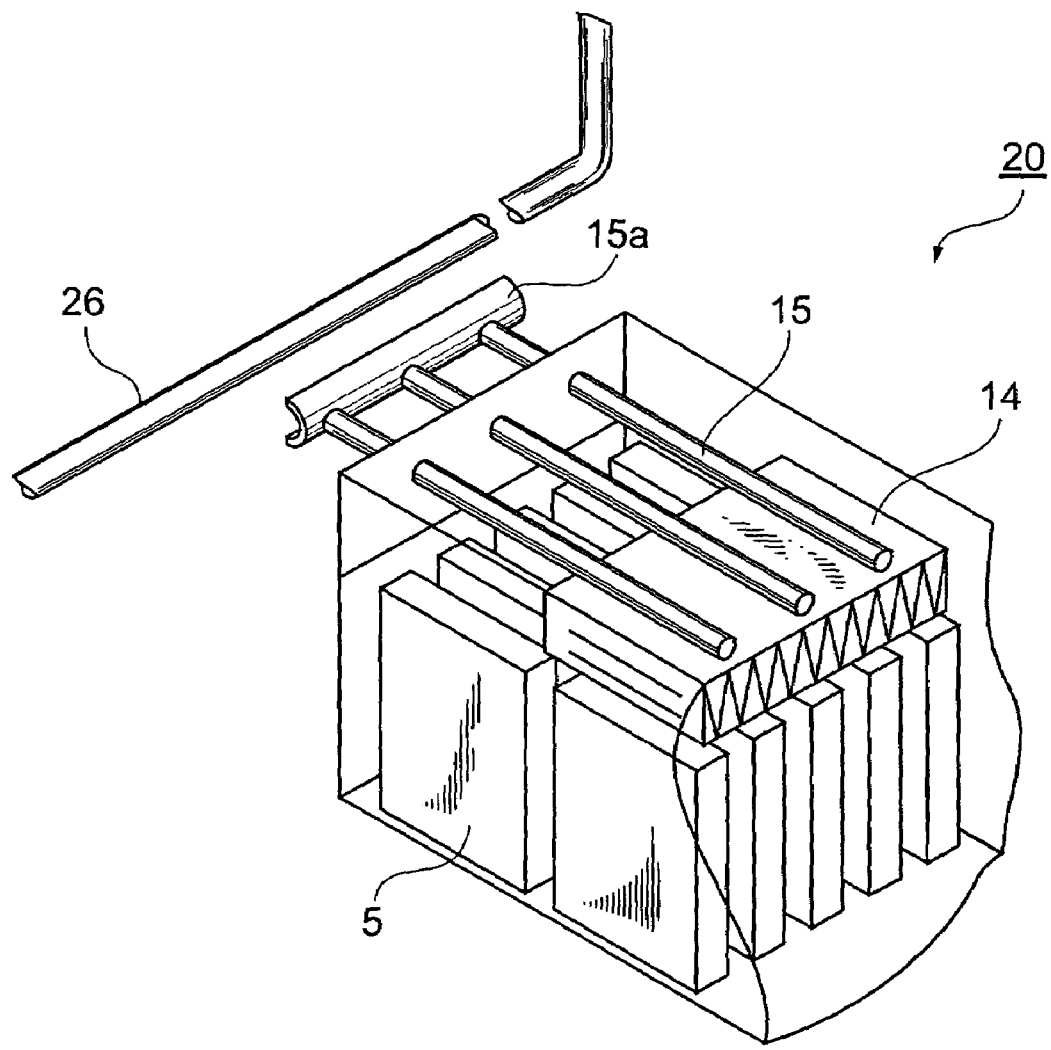
FIG. 7 is a perspective view of the coupling structure between the refrigerant flow path and the heat transport media.
Figure 8:
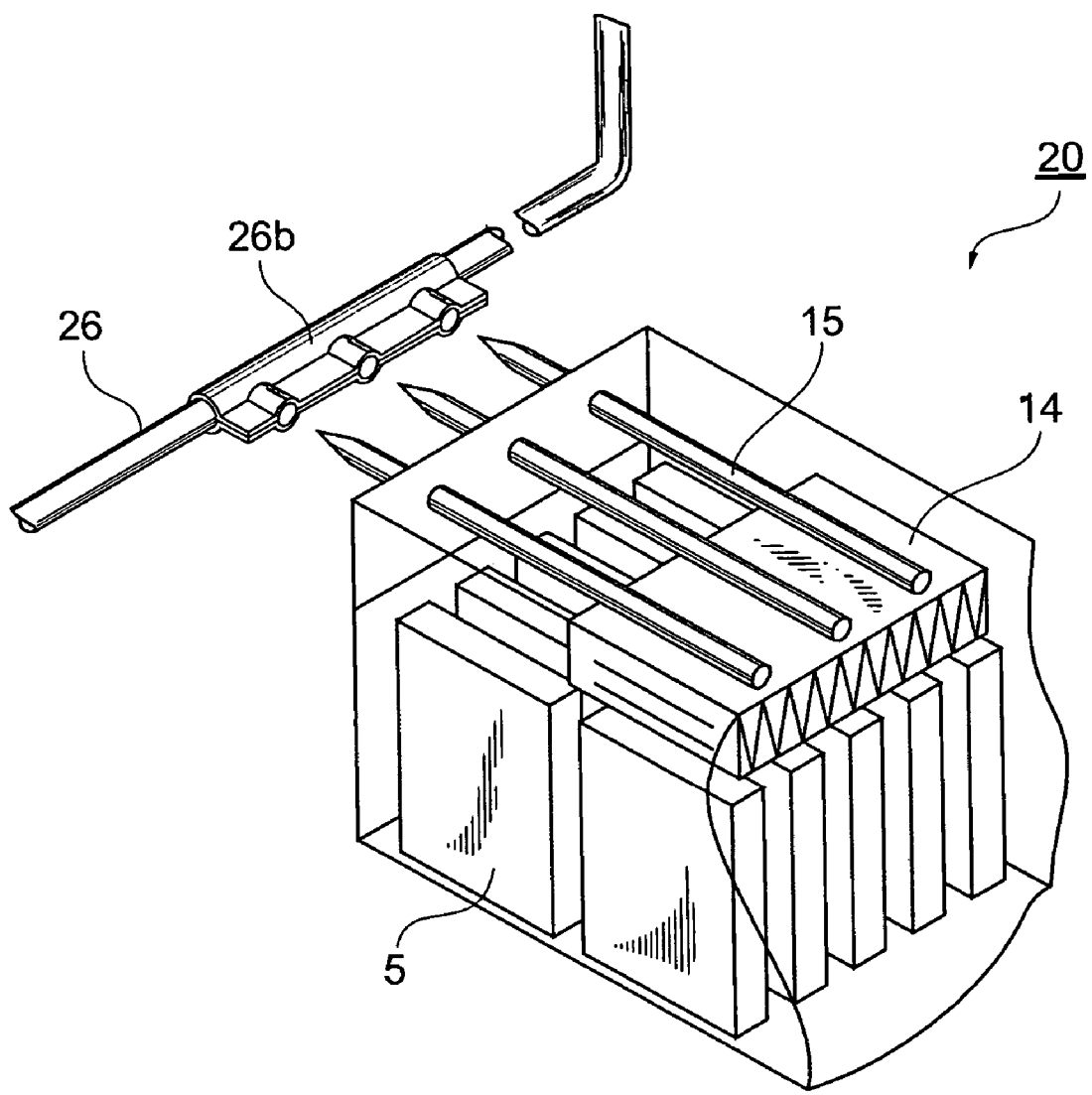
FIG. 8 is a perspective view of the coupling structure between the refrigerant flow path and the heat transport media.

Next, a coupling structure between the disk box 20 and the refrigerant flow path 26 will be described with reference to FIGS. 5 to 8. FIGS. 5, 7, and 8 are perspective views of the coupling structure between the refrigerant flow path 26 and the heat transport media 15. For ease of explanation, the disk box 20 is partly omitted in these perspective views. FIG. 6 is a sectional view of the coupling section between the refrigerant flow path 26 and the heat transport media 15. Heat exchange connectors 26a are integrally formed with the refrigerant flow path 26. Each heat exchange connector 26a is of a shape that allows mechanical attachment of the heat transport medium 15 to the refrigerant flow path 26, and is made of materials that allow thermal connection of the heat transport medium 15 to the refrigerant flow path 26. Since the disk box 20 is frequently inserted into or removed from the basic frame 1 for maintenance/management, a configuration that enables smooth attachment/detachment of the heat transport media 15 to/from the heat exchange connectors 26a is ideal. For example, one end of the heat transport medium 15 may be tapered so that it can be easily inserted into the heat exchange connector 26a, or grease or the like may be applied to an area between the heat exchange connector 26a and the heat transport medium 15.

The coupling structure between the heat transport media 15 and the refrigerant flow path 26 is not limited to the above-described configuration. For example, as shown in FIG. 7, the coupling structure may be designed in such a way that a heat exchange connector 15a is first attached to the heat transport media 15, and then mechanically and thermally connected to the refrigerant flow path 26. Also, as shown in FIG. 8, the coupling structure may be designed in such a way that a heat exchange connector 26b is attached and fixed to the refrigerant flow path 26 so as to hold the refrigerant flow path 26 between the upper and lower halves of the heat exchange connector 26b, and the heat exchange connector 26b is then mechanically and thermally connected to the heat transport media 15. In the cases of FIGS. 7 and 8, it is unnecessary to use the specially-designed refrigerant flow path 26 that is integrally formed with the heat exchange connectors 26a as shown in FIG. 5, and it is possible to use general-purpose products.

Figure 9:
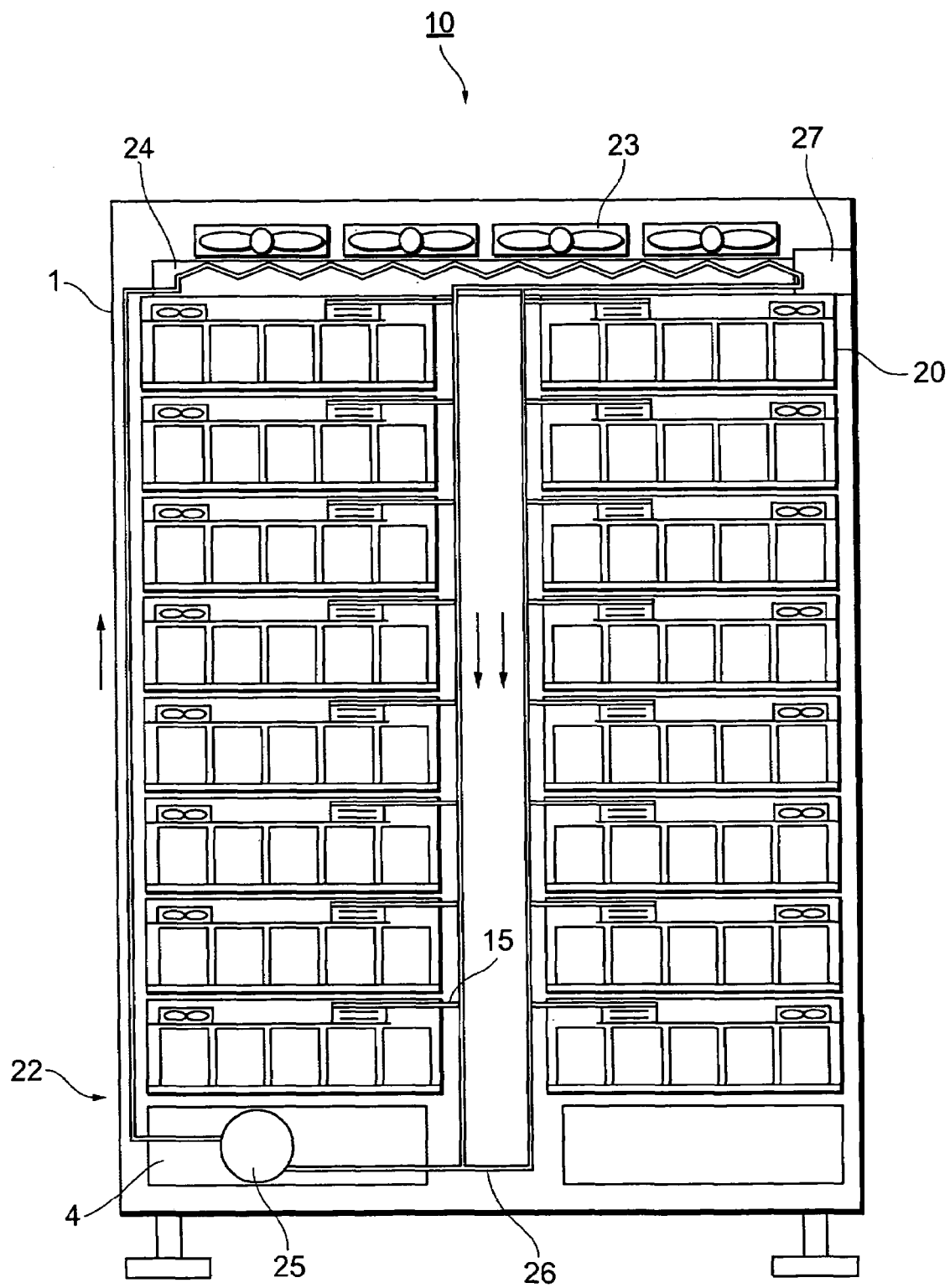
FIG. 9 is an explanatory diagram of a secondary cooling system using the refrigeration cycle.
Figure 10:
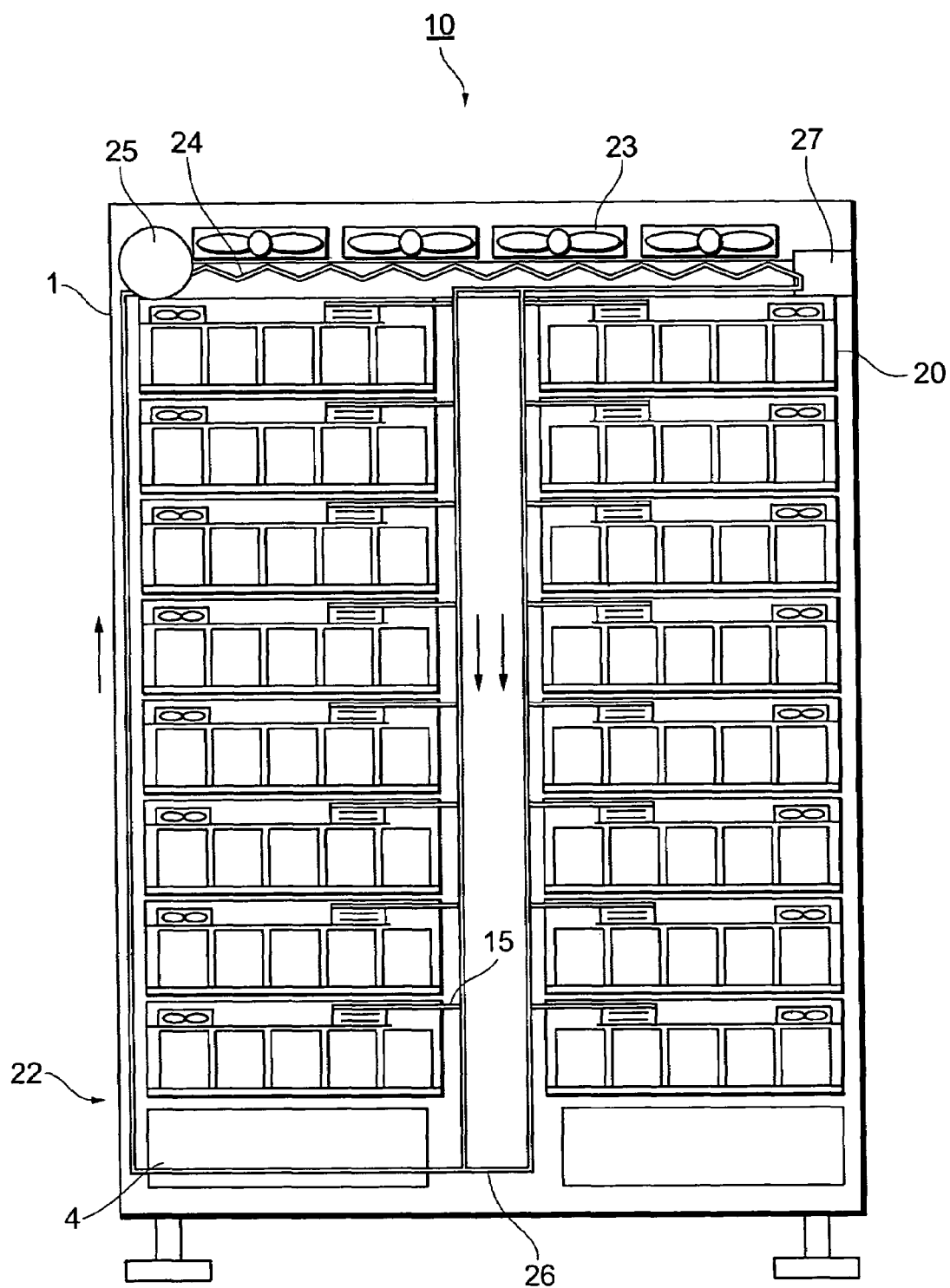
FIG. 10 is an explanatory diagram of the secondary cooling system using the refrigeration cycle.

Next, each component of the disk array apparatus 10 adopting a refrigeration cycle system as the secondary cooling system will be described with reference to FIGS. 9 to 11. The cooling system 22 includes cooling fans 23, a secondary radiator 24, a compressor 25, a refrigerant flow path 26, and an expansion valve 27. Refrigerant flowing through the refrigerant flow path 26 becomes a high-temperature, high-pressure gas (at a temperature of, for example, 100° C.) due to the compressing effect of the compressor 25; then the refrigerant becomes a high-temperature gas (at a temperature of, for example, 60° C.) due to the cooling effect of the secondary radiator 24; then it becomes a low-temperature two-phase flow (at a temperature of, for example, 0° C.) due to the adiabatic expansion effect of the expansion valve 27; and finally becomes a low-temperature gas due to the heat exchange with the disk boxes 20. The refrigeration cycle makes it possible to cool down the inside of the disk box 20 to a temperature equal to or lower than the outside air temperature. A temperature environment where the internal temperature of the disk box 20 is not affected by the outside air temperature can be established by adjusting the rotation speed of the cooling fans 12 as appropriate.

In this embodiment, the following two-step cooling systems are constructed: the cooling modules 11 for discharging the heat from the disk drives 5 to the outside of the disk boxes 20 and cooling the disk drives 5 in each disk box 20; and the cooling system 22 for discharging the heat collected from the respective disk boxes 20 to the outside air and cooling down the disk boxes 20. In this specification, the cooling modules 11 are also called a "primary cooling system," while the cooling system 22 is also called a "secondary cooling system."

Between the primary cooling system and the secondary cooling system, heat exchange is conducted, but no outflow or inflow of the refrigerant takes place. By enabling only the heat exchange between the primary cooling system and the secondary cooling system, system design can be made in such a way that an air-cooling system is adopted as the primary cooling system, while a refrigeration cycle system or a liquid-cooling system is adopted as the secondary cooling system. The disk drives 5 are usually designed with no water resistance. Therefore, from the viewpoint of maintaining reliability, the air-cooling system is ideally used as the primary cooling system.

On the other hand, the disk box 20 is hermetically sealed and, therefore, exhibits noise insulation as described above and is also resistant to water. Accordingly, not only the air-cooling system, but also the refrigeration cycle system or the liquid-cooling system can be adopted as the secondary cooling system. If the refrigerant should happen to leak out of the refrigerant flow path 26, the disk drives 5 will not be affected by the leakage because the disk box 20 is hermetically sealed.

If the refrigeration cycle system or the liquid-cooling system is adopted as the secondary cooling system, the heat of the disk boxes 20 can be efficiently absorbed and discharged to the outside air. Accordingly, it is possible to keep the rotation speed of the cooling fans 12 low and expect low-noise.

Incidentally, the positions to install the disk boxes 20 in are ideally adjusted so that each disk box 20 will be cooled uniformly. For example, as shown in FIGS. 9 to 11, when the disk boxes 20 are placed on both the right and left sides of the disk array apparatus 10, the disk boxes 20 are ideally mounted to have precise right-left symmetry. If there is bias in the positions of the disk boxes 20, only part of the refrigerant flow path 26 will contribute to cooling the disk drives 20, and efficient cooling will not be carried out. Moreover, since the refrigerant flowing through the refrigerant flow path 26 undergoes a rise in temperature when flowing from upstream to downstream, the rotation speed of the cooling fans 12 for the disk boxes 20 installed on the downstream side of the refrigerant flow path 26 is ideally adjusted to become higher than the rotation speed of the cooling fans 12 for the disk boxes 20 installed on the upstream side of the refrigerant flow path 26.

It is also ideal to use a large-capacity fan as the cooling fan 23. When the capacity of the cooling fan 23 is large, a certain air volume can be obtained even at a low rotation speed, achieving low-noise. When a plurality of cooling fans 23 is installed at the top of the basic frame 1, the rotation speeds of the respective cooling fans 23 are ideally almost the same. In this way, the respective disk boxes 20 can be cooled uniformly. If a large number of disk boxes 20 are present, the amount of heat exchange between the refrigerant flowing through the refrigerant flow path 26 and the outside air increases. Therefore, it is desirable to adjust the rotation speeds of the cooling fans 23 depending on the number of disk boxes 20 present. Also, the rotational speed of the cooling fans 12 mounted in each disk box 20 may be adjusted based on not only the temperature detected by the temperature sensor 16, but also the positions of the disk boxes 20, the quantity of the disk boxes 20, the quantity of the dummy disk drives, and the rotation speeds of the cooling fans 23.

Ideally, the compressor 25, which weighs a lot, is located at the bottom of the basic frame 1. If the centre of gravity of the entire disk array apparatus 10 is lowered, stability in an earthquake will be enhanced. However, the compressor 25 may be installed at the top of the basic frame 1 as shown in FIG. 10, thereby concentrating the main devices of the cooling system 22 in a single area. This will make maintenance management easier.

Figure 11:
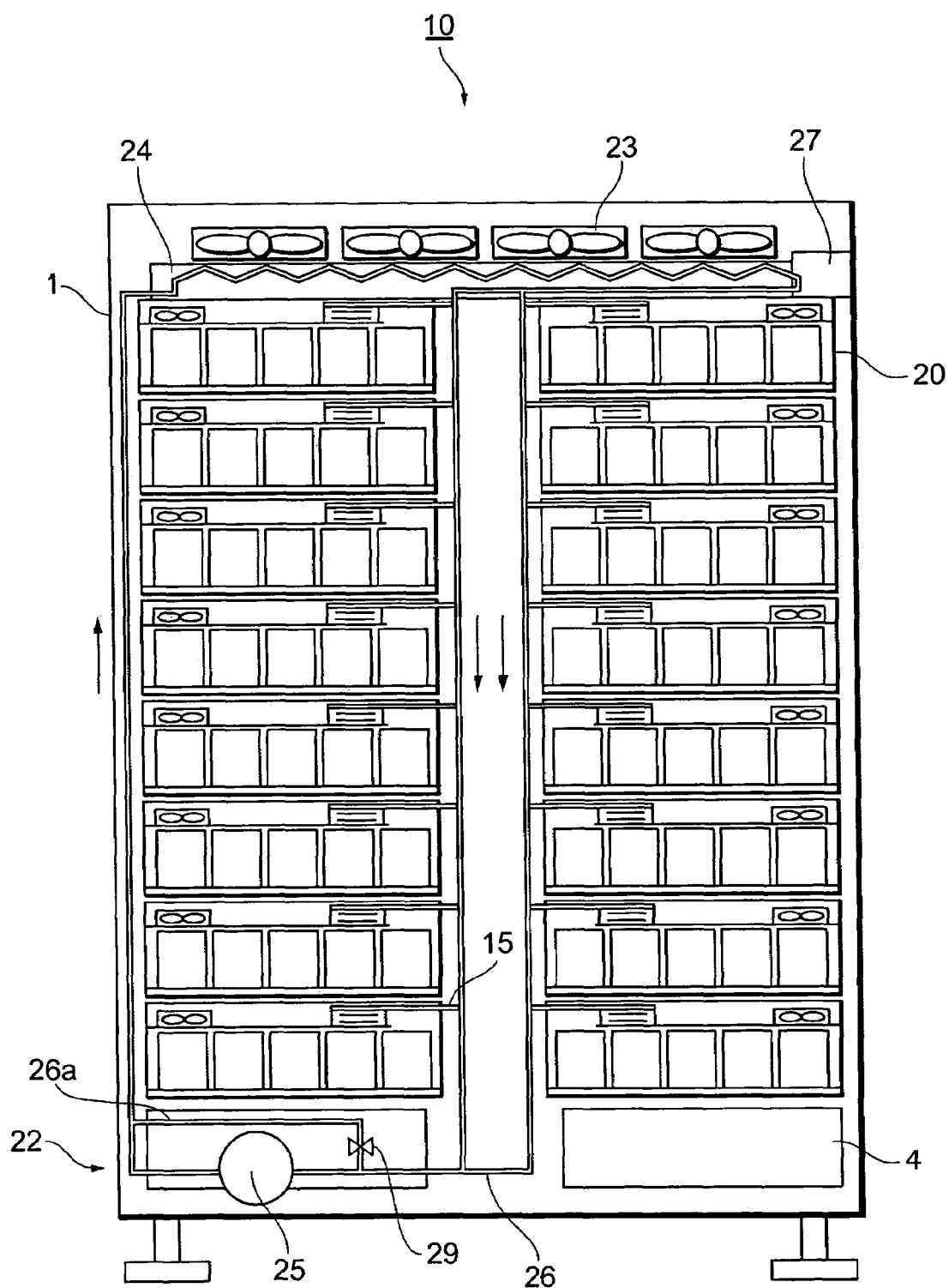
FIG. 11 is an explanatory diagram of the secondary cooling system using the refrigeration cycle.

If the refrigeration cycle is adopted as the secondary cooling system, the following components may be placed as shown in FIG. 11: a bypass path 26a for branching off from the refrigerant flow path 26, bypassing the compressor 25 and then joining the refrigerant flow path 26; and a bypass valve 29 for adjusting the flow rate of the refrigerant flowing through the bypass path 26a. When the disk array apparatus 10 consumes little electric power, if the bypass valve 29 and the expansion valve 27 are fully opened, the refrigerant will be circulated naturally by convection and the disk boxes 20 can thereby be cooled even if the compressor 25 is stopped.

Figure 12:
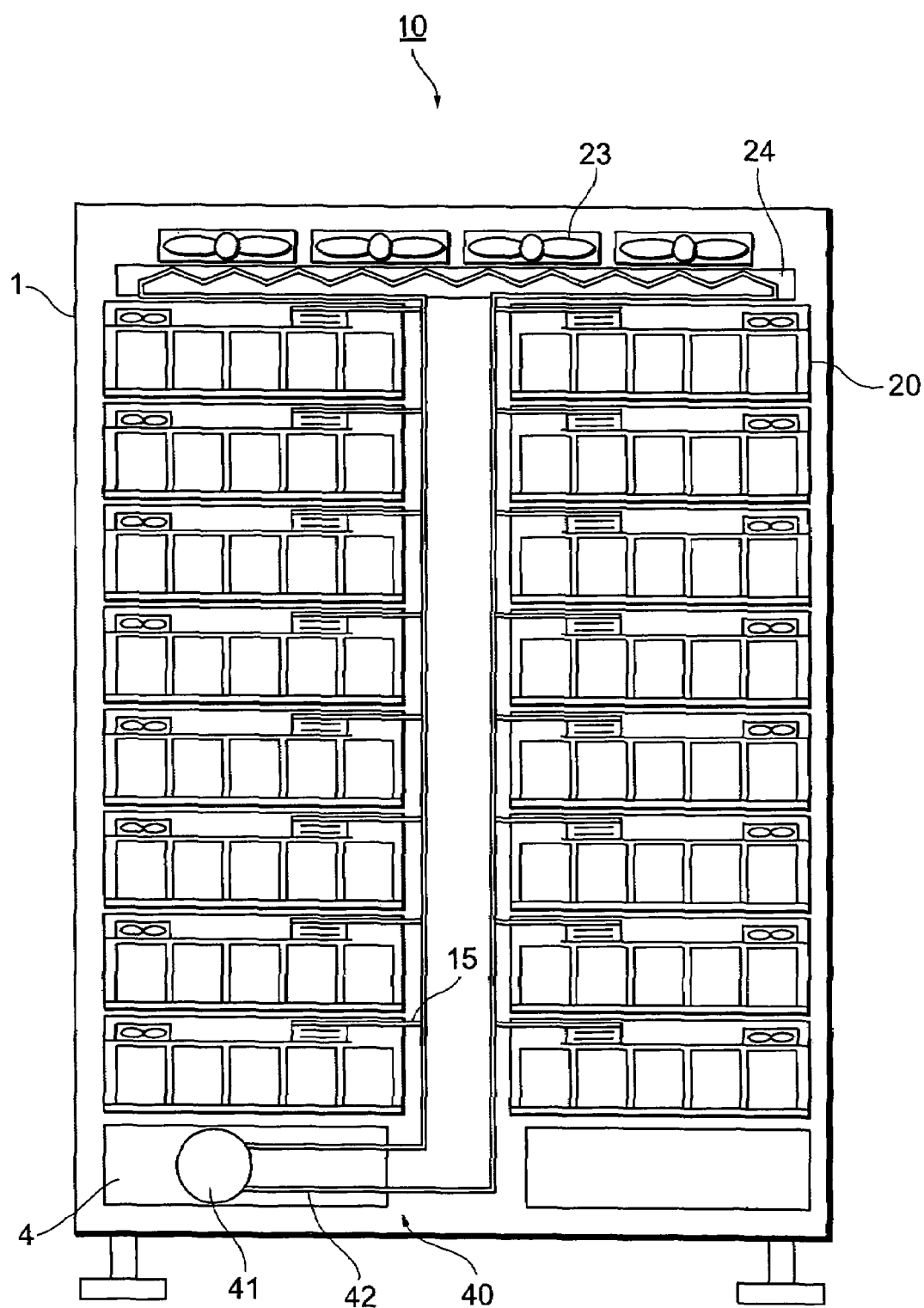
FIG. 12 is an explanatory diagram of the secondary cooling system using the liquid-cooling system.

Next, each component of the disk array apparatus 10 adopting the liquid-cooling system as the secondary cooling system will be described with reference to FIG. 12. A cooling system 40 includes cooling fans 23, a secondary radiator 24, a circulating pump 41, and a cooling liquid flow path 42. The cooling liquid flow path 42 is thermally connected to the heat transport media 15 of the disk boxes and provides the heat transported from the disk boxes 20 to the cooling liquid. The cooling liquid circulated through the cooling liquid flow path 42 by the circulating pump 41 provides the heat collected from the disk boxes 20 to the secondary radiator 24. The secondary radiator 24 discharges the heat to the outside air under the air blowing action of the cooling fans 23.

Figure 13:
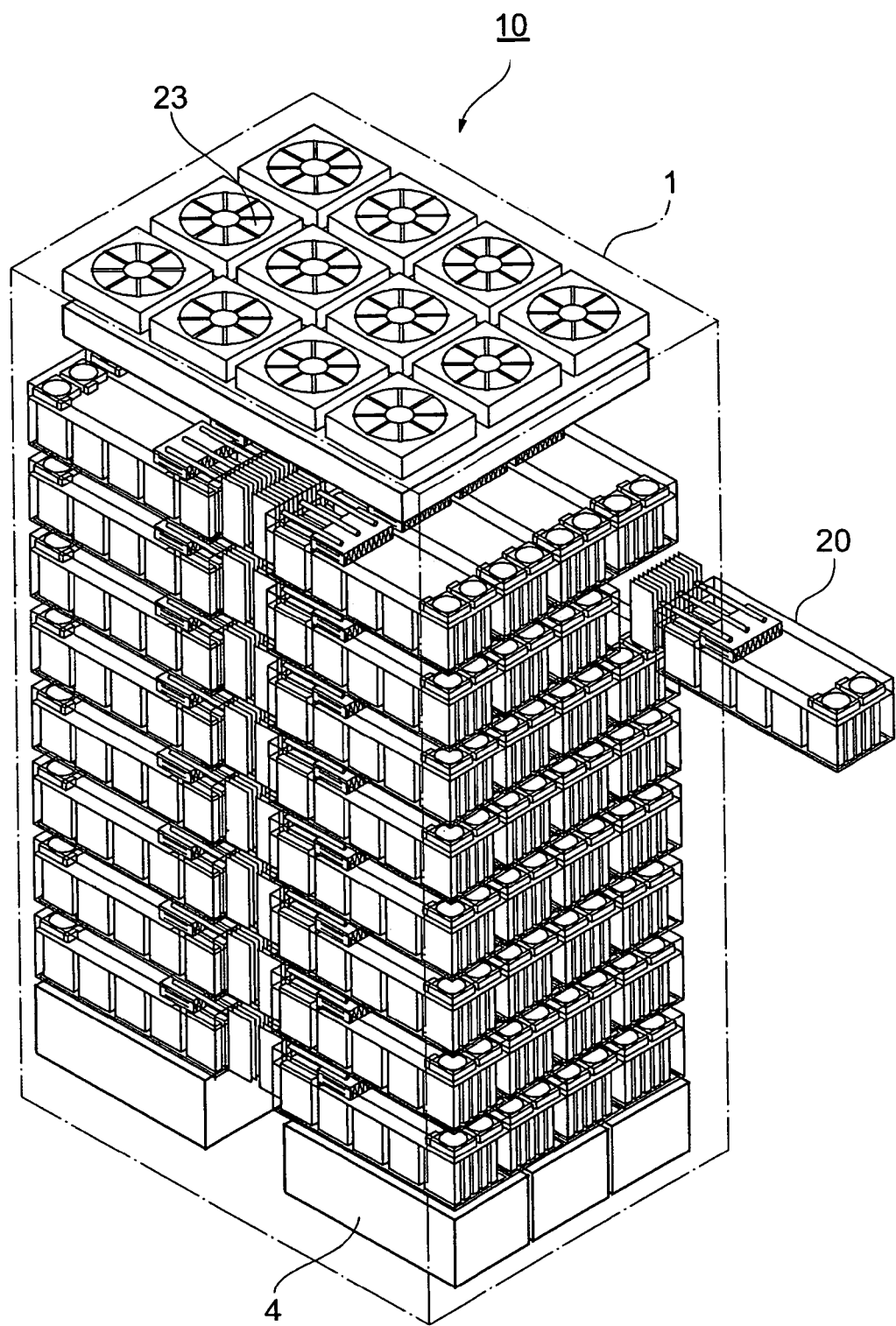
FIG. 13 is an external view of the disk array apparatus according to another embodiment of this invention.
Figure 14:
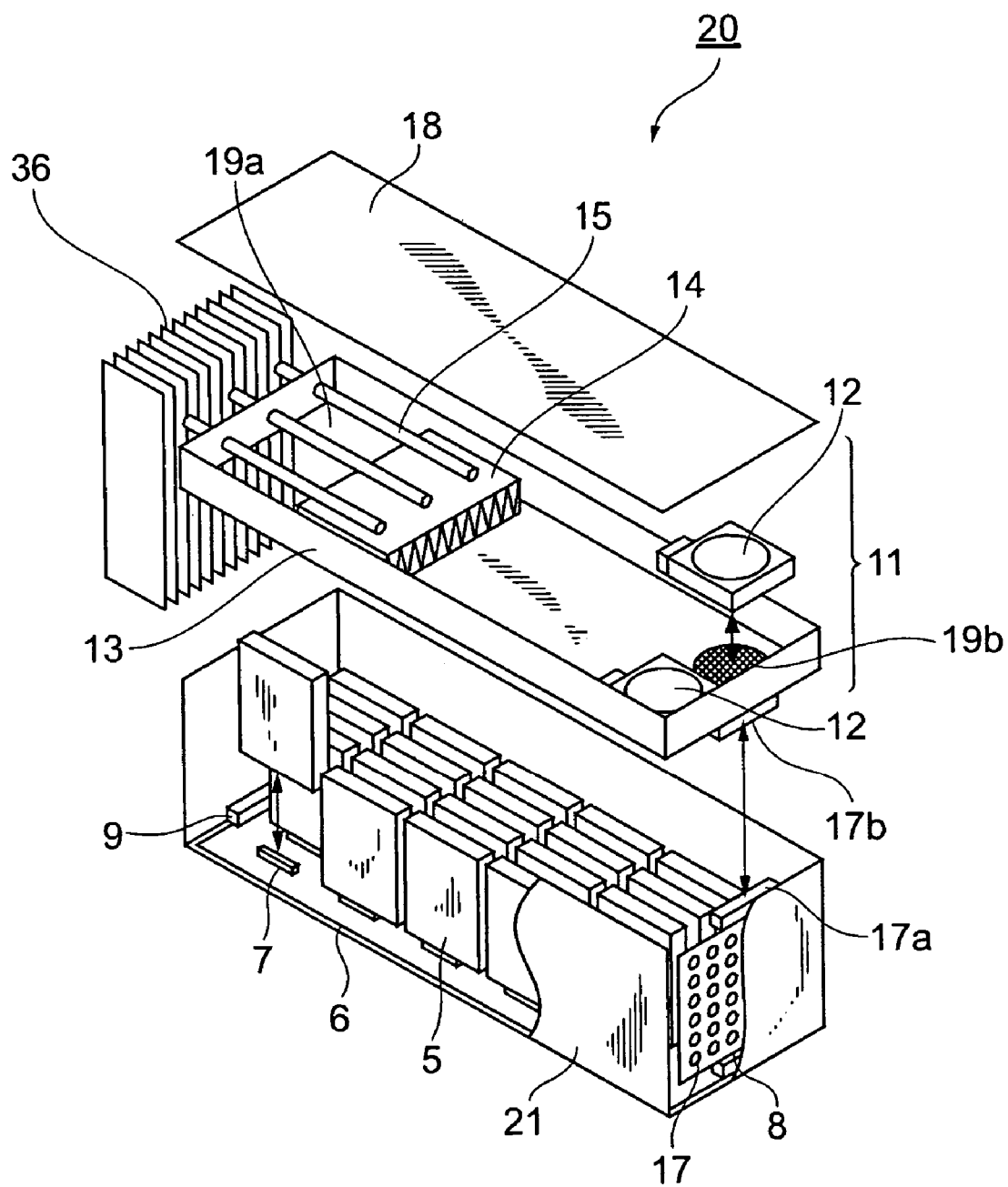
FIG. 14 is an exploded perspective view of a disk box according to that embodiment.
Figure 15:
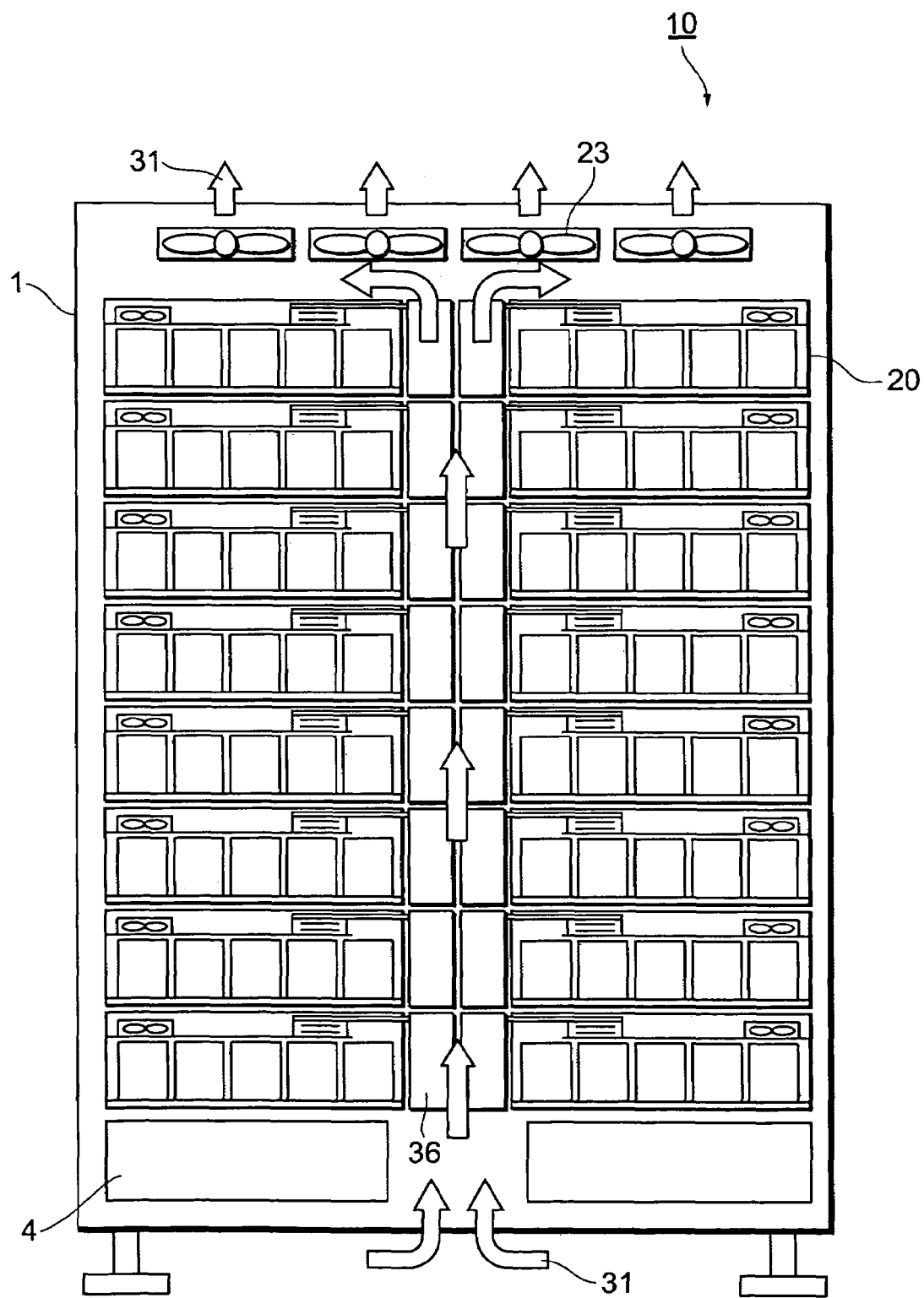
FIG. 15 is an explanatory diagram of a secondary cooling system using the air-cooling system.

Now, each component of the disk array apparatus 10 adopting the air-cooling system as the secondary cooling system will be described with reference to FIGS. 13 to 15. FIG. 13 is an external view of the disk array apparatus 10. FIG. 14 is an exploded perspective view of the disk box 20. FIG. 15 is an explanatory diagram of the secondary cooling system for the disk array apparatus 10. Devices in FIGS. 13 to 15 that are given the same reference numerals as those used in FIGS. 1 to 12 are considered to be the same devices as shown in FIGS. 1 to 12, and any detailed description of such devices is thereby omitted.

A heat exchanger 36 is placed at one end of the heat transport media 15. The heat exchanger 36 is, for example, a heat sink or a radiator. When the cooling fans 23 rotate, an air current 31 ascending within the basic frame 1 is produced. The air current 31 absorbs heat from the heat exchangers 36 and exits from the ceiling plane of the basic frame 1 to the outside air. The heat radiation from the disk boxes 20 generates convection at the heat exchanger 36. Accordingly, an efficient flow can be generated by producing the air current 31 in such a way that the current direction of the air current 31 will be from down to up, that is, in an upward direction against gravity. However, depending on installation conditions for the disk array apparatus 10 and the relationship with other components, the current direction of the air current 31 doesn't necessarily have to be an upward direction, but may be a horizontal direction, a downward direction, or an oblique direction.

Figure 16:
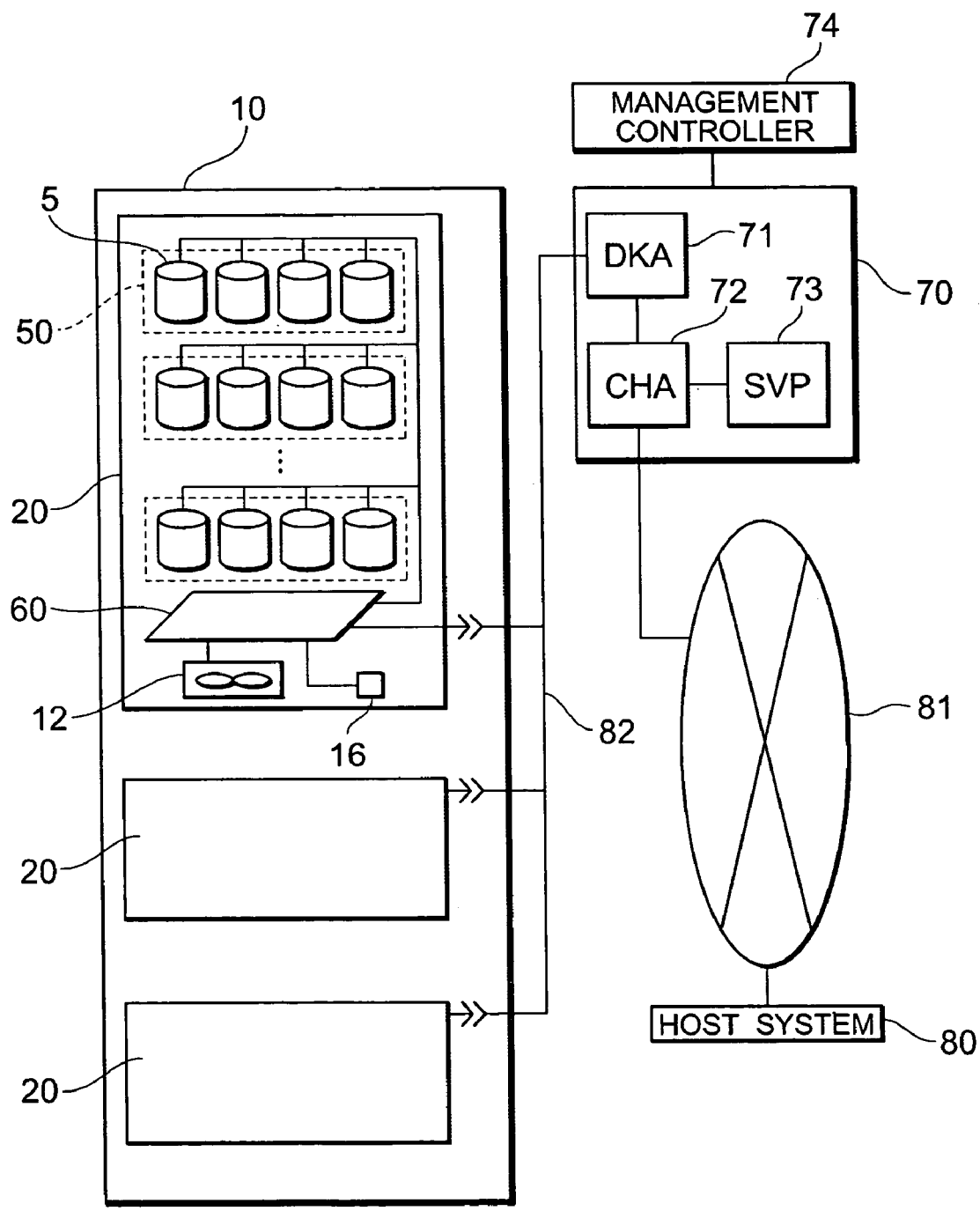
FIG. 16 is a system configuration diagram of a control system for the disk array apparatus.

FIG. 16 shows the system configuration of a control system for the disk array apparatus 10. Devices in FIGS. 16 that are given the same reference numerals as those used in FIGS. 1 to 15 are considered to be the same devices as shown in FIGS. 1 to 15, and any detailed description of those devices is thereby omitted. In the disk box 20, a plurality of disk drives 5 constituting the same RAID group is aligned in a direction perpendicular to the wind direction of the cooling fans 12. Each disk box 20 is equipped with a control board 60 for drive control of the cooling fans 12 based on the temperature detected by the temperature sensor 16. The control board 60 is connected, via a network 82, to a controller 70 and provides an interface to send and receive data and commands to and from the disk controller 70.

The disk controller 70 includes a disk adapter (DKA) 71, a channel adapter (CHA) 72, a management terminal (SVP) 73, and a management controller 74. The disk adapter 71 controls data input to and output from a back interface between the disk drives 5 and the disk controller 70. The channel adapter 72 controls data input to and output from a front interface between a host system 80 and the disk controller 70.

The management terminal 73 is a terminal device to maintain and manage the disk array apparatus 10. By operating the management terminal 73, a system manager can, for example, increase or decrease the number of disk drives 5, change the RAID configuration (for example, change from RAID 1 to RAID 5), set a path between the host system 80 and the channel adapter 72, and install microprograms on the disk adapter 71 or the channel adapter 72. It is also possible to execute operations such as confirmation of the operating state of the disk array apparatus 10 and identification of faulty sections, by operating the management terminal 73. These various settings and control can be conducted through a user interface, such as a GUI, included in the management terminal 73.

The management controller 74 controls auxiliary machines of the disk array apparatus 10, such as the aforementioned secondary cooling system (including the cooling fans 23, the compressor 25, the expansion valve 27, the bypass valve 29, and the circulating pump 41) and the power supply unit 4.

The host system 80 is connected via the network 81 to the disk controller 70. Examples of the network 81 include a LAN (Local Area Network), a SAN (Storage Area Network), the Internet, private lines, or public lines. Data communication via a LAN is conducted according to TCP/IP (Transmission Control Protocol/Internet Protocol). If the host system 80 is connected via a LAN to the disk controller 70, the host system 80 requests data input and output in files by designating file names. On the other hand, if the host system 80 is connected via a SAN to the disk controller 70, the host system 80 requests data input and output in blocks, which are the data management units for storage resources provided by a plurality of disk drives 5, according to Fibre Channel Protocol.

Figure 17:
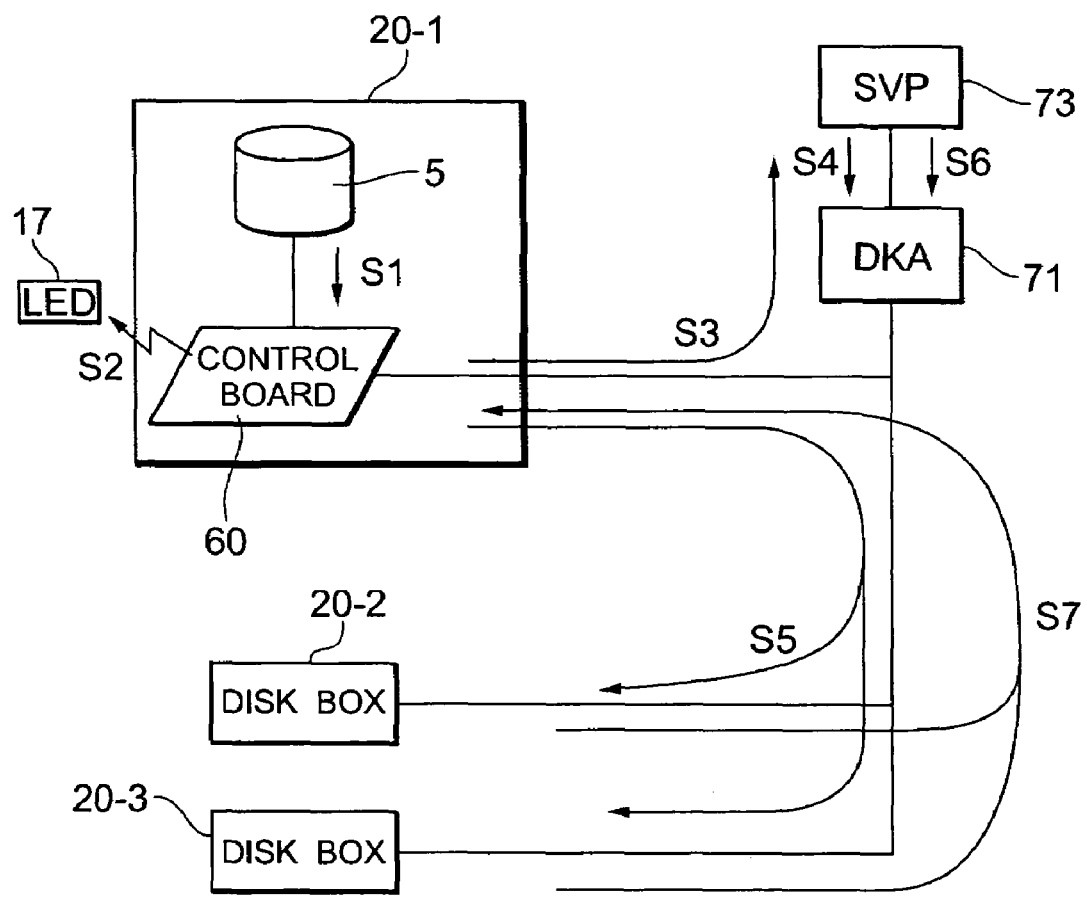
FIG. 17 is a flowchart illustrating a data backup processing sequence.

Next, replacement procedures upon the occurrence of an error such as a failure of a disk drive 5 or a cooling fan 12 will be described with reference to FIG. 17. When an error occurs in a disk drive 5 or a cooling fan 12, the control board 60 detects the occurrence of the error (S1), turns on an LED 17 to report the occurrence of the error to a system manager (S2) and sends an error occurrence signal to the management terminal 73 (S3). When the system manager operates the management terminal 73 and enters a data backup instruction (S4), the disk adapter 71 moves data on normal disk drives 5 in a disk box 20-1, in which the error has occurred, to other disk boxes 20-2 and 20-3 (S5).

When the data backup is complete, the disk controller 70 sends a signal to enable the removal of the disk box 20-1, to the control board 60. The control board 60 turns on the LED 17 and thereby reports the backup completion to the system manager. The system manager pulls out the disk box 20-1 from the disk array apparatus 10, replaces or repairs the relevant component, and then puts the disk box 20-1 back in its original position. When the system manager operates the management terminal 73 and enters a data recovery instruction (S6), the disk adapter 71 reads the backup data from the disk boxes 20-2 and 20-3 and returns it to the disk box 20-1, carrying out data recovery (S7).

Even if a failure occurs in a disk box 20, data recovery can be implemented by the above-described method of backing up the data on normal disk drives 5 to other disk boxes 20. Therefore, reliability of the disk array apparatus 10 can be enhanced.

What is claimed is:

1. A disk array apparatus for mounting a plurality of disk drives, the disk array apparatus comprising:
   a rack-shaped basic frame; and
   a plurality of disk boxes that can be inserted into and pulled out of the basic frame depth-wise,
   wherein each of the disk boxes has a coupling structure for connecting a plurality of disk drives arranged in a matrix on the bottom face of the disk box roughly parallel to the depth direction of the basic frame,
   the disk box is a hermetically sealed structure,
   each of the disk boxes includes a cooling module for cooling the disk drives in the corresponding disk box, and
   the cooling module further includes a blower mechanism for forcedly circulating gas within a hermetically sealed space of the disk box.

2. The disk array apparatus according to claim 1, wherein the cooling module further includes a heat transport medium for transporting heat generated from the disk drives to the outside of the disk box.

3. The disk array apparatus according to claim 2, wherein the disk box is made of a heat insulator.

4. The disk array apparatus according to claim 1, wherein the cooling module further includes at least two blower mechanisms.

5. The disk array apparatus according to claim 1, wherein the cooling module includes a heat exchanger for exchanging heat between the gas and the heat transport medium.

6. The disk array apparatus according to claim 1, wherein the cooling module further includes a temperature sensor for detecting the internal temperature of the disk box.

7. The disk array apparatus according to claim 1, wherein the cooling module further includes a control board for adjusting the air distribution amount of the blower mechanism based on the temperature detected by the temperature sensor.

8. The disk array apparatus according to claim 1, wherein the disk box is made of a sound insulator.

9. The disk array apparatus according to claim 1, further comprising a cooling system for exchanging heat between the disk boxes.

10. The disk array apparatus according to claim 9, wherein the cooling system is any one of a refrigeration cycle system, a liquid-cooling system, and an air-cooling system.

11. The disk array apparatus according to claim 1, further comprising a disk controller,
    wherein the disk controller enables removal of the disk box in which an error has occurred, after the backing up of data on the disk drives mounted in the disk box, in which the error has occurred, to another disk box.

12. A disk array apparatus for mounting a plurality of disk drives, the disk array apparatus comprising:
    a rack-shaped basic frame; and
    a plurality of disk boxes that are each hermetically sealed structures and each can be inserted into and pulled out of the basic frame along its depth direction,
    wherein each of the disk boxes has a first coupling structure for connecting a plurality of disk drives arranged in a matrix on the bottom face of the disk box roughly parallel to the depth direction of the basic frame, and a primary cooling system in each disk box for transporting heat generated from the disk drives to the outside of the disk boxes,
    wherein the basic frame includes a secondary cooling system for discharging, to the atmosphere, the heat transported to the outside of the respective disk boxes, and
    wherein the primary cooling system is an air-cooling system, while the secondary cooling system is any one of a refrigeration cycle system, a liquid-cooling system, and an air-cooling system.

13. The disk array apparatus according to claim 12, wherein the primary cooling system includes a second coupling structure that can be attached to and detached from the secondary cooling system in such a way that heat can be exchanged between the primary cooling system and the secondary cooling system.

* * * * *